United States Patent
Sims

[11] 3,930,567
[45] Jan. 6, 1976

[54] CHUTE FOR FRONT END DISCHARGE CONCRETE MIXERS

[75] Inventor: Robert L. Sims, Salt Lake City, Utah

[73] Assignee: Travel Batcher Corporation, Salt Lake City, Utah

[22] Filed: Sept. 30, 1974

[21] Appl. No.: 510,302

[52] U.S. Cl. .................................. 193/10; 193/4
[51] Int. Cl.² ................ B65G 11/12; B65G 11/14
[58] Field of Search .............. 193/2 R, 2 A, 3, 4, 5, 193/6, 10, 16, 17; 198/87, 113, 114, 115

[56] References Cited
UNITED STATES PATENTS

| | | | |
|---|---|---|---|
| 1,178,326 | 4/1916 | Lichtenberg | 193/10 X |
| 1,190,564 | 7/1916 | Lindsay | 198/87 X |
| 1,978,014 | 10/1934 | Dion | 193/2 R |
| 2,859,949 | 11/1958 | Willard | 193/16 X |
| 3,085,675 | 4/1963 | Feiteira | 198/113 |
| 3,456,769 | 7/1969 | Prichard | 193/4 |
| 3,774,741 | 11/1973 | Johnson | 193/10 |

Primary Examiner—Evon C. Blunk
Assistant Examiner—James L. Rowland
Attorney, Agent, or Firm—John A. Young

[57] ABSTRACT

A fluid motor actuator, including a hydraulic cylinder, includes a cam which is extended to become engagable with a cam follower of an extension chute section which is hinged and folded within a first chute section during transport. When the cam engages the follower of the retracted extension chute section, the cam causes the extension section to pivot out of its retracted position so that both chute sections form a unitary elongated chute adapted for receiving and directing the flow of concrete from the bowl of the mixer to the construction site. The extension chute section is retracted when the pour is completed and the cam is moved to non-interfering relation with the chute against the yieldable resistance of a spring.

4 Claims, 5 Drawing Figures

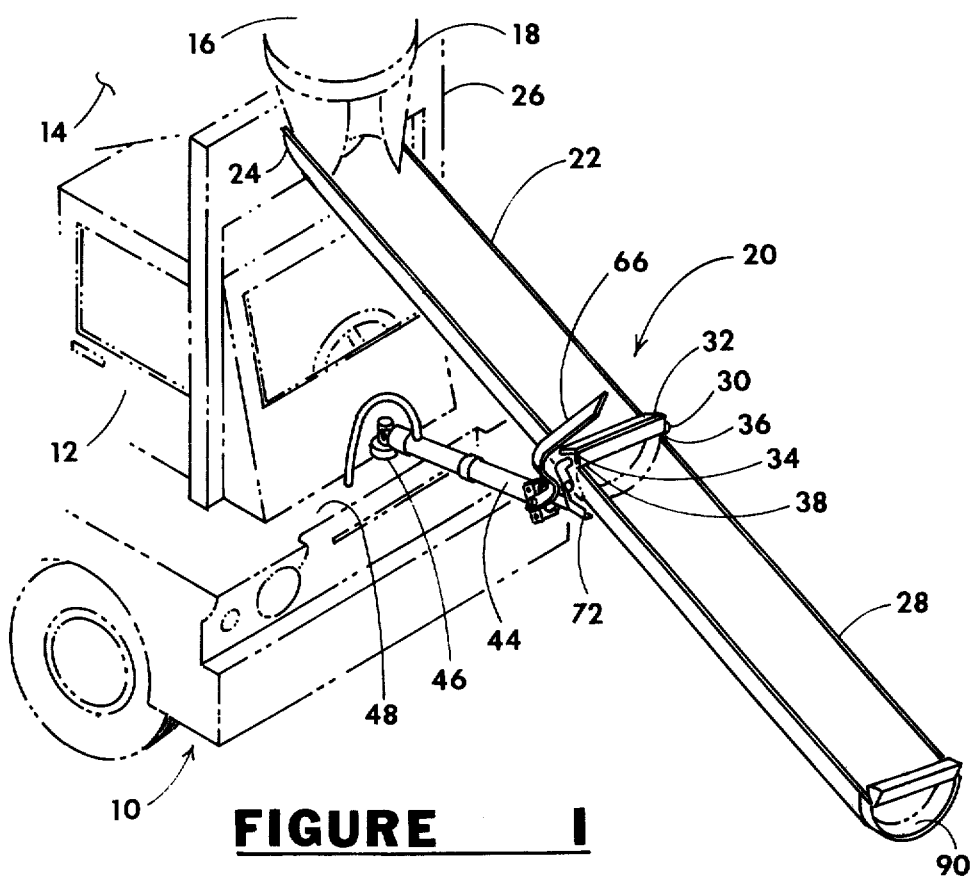
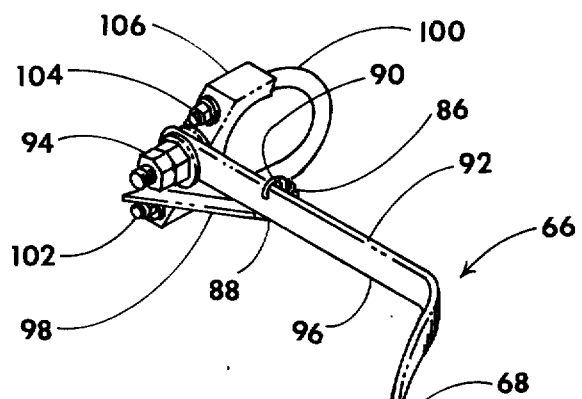
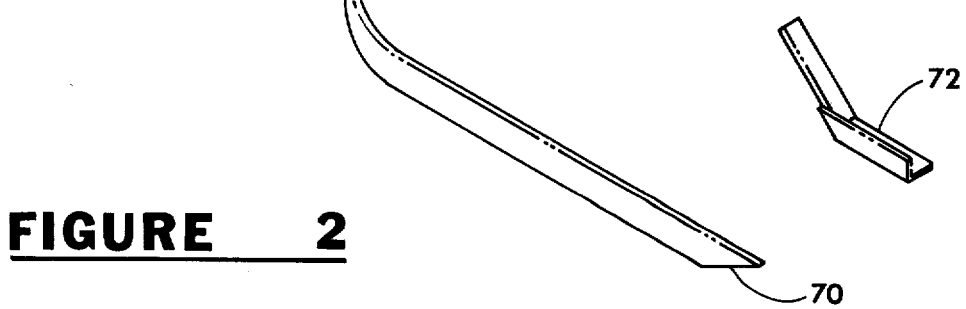

CHUTE FOR FRONT END DISCHARGE CONCRETE MIXERS

BACKGROUND OF THE INVENTION

In the Willard patent, U.S. Pat. No. 2,859,949 issued Nov. 11, 1958, there is disclosed a forward discharging transit concrete mixer which embodies the general advantage of making a pour within the direct view of the operator located in the cab. The advantages of this type of system have been proved in many hundreds of units which are now in operation throughout the U.S. What is needed, however, is a means for retracting the chute during transit between mixer station and job site so that the chute will not obstruct the view of the driver. But at the time the pour is made, there is needed a ready and convenient means whereby the chute can be extended and controlled angularly so that the site of the pour can be accurately determined by controls available to the operator within the cab. Thus, when the operator reaches the point where the pour is to be made, he has available to him various controls within the cab which will extend the chute, position the chute and he can then proceed by moving both the truck and the chute to accurately pinpoint where the discharging concrete should be laid.

It is therefore an object of the present invention to provide a new and different control mechanism whereby the hinged extension chute can be remotely extended from a retracted, out-of-the-way position which is not obstructive to the view of the driver in the cab and which at the same time is susceptible to easy and reliable operation whereby the chute can be extended and retracted.

It is another object of the present invention to provide a chute control consisting of a relatively few number of parts which are rugged (it being understood that these component parts of the chute are exposed to rough handling at job sites where parts are exposed to damage) and which can function to remotely position the chute.

It is another object of the present invention to provide a simple actuating mechanism whereby the chute can be moved from retracted to fully extended position and permit the chute to be swung both in an arc and in both a vertical and horizontal sense to maximize the controllability and positioning of the chute to a precise discharge location.

An overall object of the present invention is to provide a cam and cam follower combination which is actuated by a fluid motor actuator so that the cam will be extended from the hydraulic cylinder into engagement with the cam follower portion on the chute to effect its 180° movement about a hinge from a first position wherein it is folded against the one chute section, to a second position wherein it becomes joined end to end with the first chute section and is held in such extended position by a lock formed between the two chute sections.

Other objects and features of the present invention will become apparent from a consideration of the following description which proceeds with reference to the accompanying drawings.

DRAWINGS

FIG. 1 is an isometric detail view of the front end of the concrete mixer truck showing the chute fully extended;

FIG. 2 is an enlarged isometric detail view of the cam portion of the extending mechanism shown in FIG. 1;

FIG. 3 is an enlarged isometric detail view of the follower which biases the chute to its extended or operative position;

DETAILED DESCRIPTION OF THE INVENTION

Figure 4:
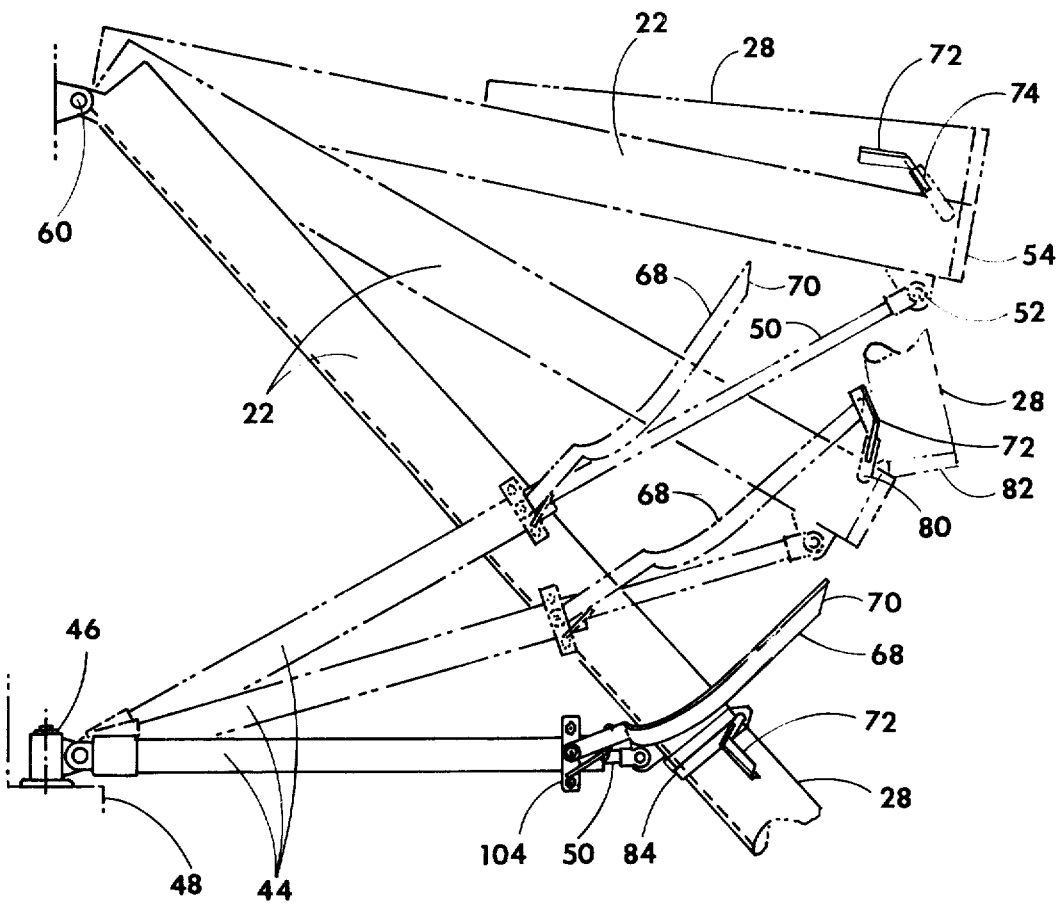
FIG. 4 is a side elevation view showing in progressive view the chute first in full line position, and then progressively extended in the dotted line views, the intermediate dotted line views showing the chute partially extended and the lowermost dotted view illustrating the chute fully extended.

Referring to FIG. 1, the front end discharge concrete mixer designated generally by reference numeral 10 includes a cab 12 and a bowl 14 which is mounted so that the concrete discharges from the forward end 16 of the bowl 14, passes through a vertical section 18 and then into a chute designated generally by reference numeral 20.

The chute 20 includes a first section 22 which is pivotally mounted at end 24 on a mounting bracket 26 and a second section 28 which is hingedly mounted to section 22 through a pin 30 which is secured at ends 32 and 34 in trunnions 36 and 38 which form a part of the chute section 22. During transport, chute section 28 is swung backwardly on hinge pin 30 to the full line position shown in FIG. 4. A power cylinder 44 having a pivot pin connection 46 to the base 48 of the truck includes a piston (not shown) with a piston rod 50 secured at end 52 to the projecting portion 54 of chute section 22. As the piston moves in its retractile stroke piston rod 50 is drawn into the cylinder 44 thus pivoting chute 22 downwardly about its pin connection 60 with bracket 26 adjacent the cab 12.

Mounted on cylinder 44 is cam rod 66 having an offset portion 68 and an inclined face 70 which engages a cam follower 72 secured by weld, bolts, or the like 74 to the chute section 28 so that, as indicated in FIG. 4, as the piston rod 50 is successively retracted the chute section 22 is pivoted in a clockwise direction, progressively in the manner indicated by the dashed lines (FIG. 4). The downward arcuate movement of chute section 22 causes chute 28 and the cam follower 72, by its engagement with face 70 of cam rod 66, to move clockwise about pivot 80 and such movement continues until the chute section 28 comes to an over-center position relatively to the pin mounting 80. The chute section 28 then moves under its own weight until the edge 82 engages a stop 84 at the end 54 of chute section 22, at which time the two chute sections form a single complementary chute for directing the flow of concrete discharging from the end 16 of the bowl and descending through the chute section 18 and dropping into the chute for final discharge at the location determined by the angular position of the chute. There can be provided additional extension chutes (not shown).

The chute is controlled angularly, that is, it can be turned to the right and to the left by the driver from his cab position and the chute can also be raised and lowered. Those two controls together with the control exerted by the driver from the steering wheel and the back and forth movement of the truck unit as a whole, enables the driver to accurately position where the discharging concrete shall be located. After the chute section 28 is positioned as indicated in FIG. 1 (in lowest position in FIG. 4), a resilient spring 86 which is hooked at one end 88 (not shown) to a fixed structure 98 and at the other end 90 to edge 92 of a cam arm 68 will cause the arm to pivot about its pivot bolt 94 until the bottom edge 96 engages a stop 98. The stop and its associated structure is mounted through a clamp 100, washers and a pair of nuts 102, 104 onto a bracket 106 as indicated in FIG. 2.

Figure 5:
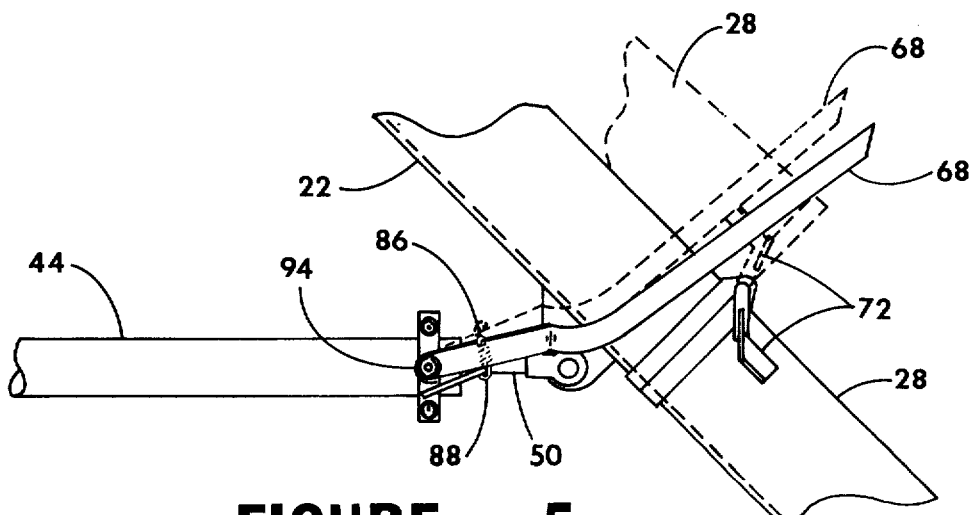
FIG. 5 is a detail view of the spring mechanism allowing the chute to be retracted for storage.

Referring to FIG. 5, spring 86 urges the cam 68 to a position enabling the chute section 28 to be pivoted counterclockwise about pivot mounting 52 because end 70 is in line to engage the section 72. But when tipping the chute section 28 back again, engagement of 72 with end 70 enables the arm to pivot counterclockwise against the action of spring 86 enabling the section 72 to move past 70 as the chute moves from dotted to full line position (FIG. 4).

OPERATION

In operation, the driver of the unit by a combination of steering and driving the unit 10 brings the chute into at least approximate position where the pour is to be made. The chute is then positionable angularly and vertically by fluid motor actuation, the vertical position of the chute being determined by power cylinder 44 wherein a piston (not shown) is moved reciprocably therein to control the position of piston rod 50 which is secured through pivot 52 to chute section 22 raising and lowering such chute section on pivot 60 (FIG. 4). When the piston (not shown) within the cylinder 44 is moved on its retractile stroke and draws the piston rod 50 into the cylinder, the chute section 22 is pivoted clockwise about 60 and the inclined end 70 of cam 68 is brought into engagement with a cam follower 72 secured to chute section 28 causing the chute section 28 to progressively turn about pivot 80 in a clockwise direction and eventually the chute section 28 is overbalanced and by its own weight continues to rotate about 80 until edge 82 engages stop 84 on the chute section 22 and is then fully extended and locked by the engagement of edge 82 and stop 84 in the full line position shown in FIG. 1.

In the full line extended position, chute section 28 and chute section 22 are complementary extensions of each other enabling the discharging concrete from the bowl 14 to exit through opening 16 and into vertical section 18 where it then drops into chute 22 slides to section 28 and then to the end 90 and discharges at the building site if desired through extension chutes.

As previously mentioned, the point of discharge is accurately controllable by the operator within the cab of the truck, by a combination of steering and driving the unit together with controlling the position and extension of the chute to accurately emplace the point of discharge within full view of the driver and without his leaving the cab. This is a substantial advantage over conventional concrete mixers which require the driver to maneuver the truck blindly since the point of discharge is at the rear of the truck and this greatly hampers the accurate placement of both the truck and the chute. Both these described obstacles are inherent in a rear discharge truck and are obviated by the present invention.

When it is time to retract the chute section 28, the spring 86 has biased the cam about its pivot connection 94 so that the end 70 engages the follower 72 but is movable against the spring force to enable the two parts to disengage from each other substantially to enable the driver to manually pivot the chute section 28 about 30 so that it is retracted from the full line position of FIG. 1 counterclockwise about 80 through the dotted line position shown in FIG. 4 to the full line position shown in FIG. 4 at which point the interfitted chute sections are then pivoted angularly to the right or to the left and out of the view of the driver so that the unit can be driven with a clear view during transit between job sites and mixing plant.

Although the present invention has been illustrated and described in connection with a single example embodiment, it will be understood that this is illustrative of the invention and is by no means restrictive thereof. It is reasonably to be expected that those skilled in the art can make numerous revisions and adaptations of the invention and it is intended that such revisions and adaptations will be included within the scope of the following claims.

What I claim is:

1. In a self propelled front end discharge concrete mixer unit having a bowl adapted for discharging concrete at the forward end of the unit, a movable chute including a pivot mounting between said movable chute and said mixer unit, a first power cylinder adapted for swinging the movable chute about its pivot at the forward end of the concrete mixer unit, said chute having two complementary sections consisting of a mounted section and an extendable section, and a hinged connection therebetween whereby said extension section is movable from a retracted doubled over position relatively to said mounted section to a second position wherein the extension section forms an elongated continuation of the mounted section, a fluid motor actuator including a cam, a cam follower forming a part of said extendable section and operatively engagable by said cam which biases the cam follower and extendable section about said hinged connection to displace said section from its retracted position to its extended position, locking means for defining the fully extended position of said extendable section wherein said first and second sections form complementary extensions of each other, and spring means biasing said cam to a position whereby said cam is disengagable with said cam follower when the retracted section of said chute is swung downwardly with the mounted chute section and providing for retractile movement of said cam as the extension chute is swung from extended to retracted position.

2. The chute construction in accordance with claim 1 wherein said power cylinder includes a cylinder, an expandable fluid chamber and an elongated piston rod, said piston rod being operatively connected to said extension chute, said cam being operatively mounted by said cylinder and engagable by said cam follower as the piston rod moves the chute section in a pivoting manner within a vertical plane.

3. The chute control in accordance with claim 1 including means for directing the flow of concrete as it discharges from the mixer bowl into the end of said chute adjacent the unit.

4. The chute construction in accordance with claim 1 including means for clamping the cam follower means onto its associated chute section.

* * * * *